(12) United States Patent
Ye

(10) Patent No.: US 8,688,151 B2
(45) Date of Patent: Apr. 1, 2014

(54) APPARATUS AND METHOD FOR TRANSMITTING MULTIMEDIA MESSAGES IN MOBILE COMMUNICATION SYSTEM

(75) Inventor: Sang-Wook Ye, Gwangmyeong-si (KR)

(73) Assignee: Samsung Electronics Co., Ltd (KR)

( * ) Notice: Subject to any disclaimer, the term of this patent is extended or adjusted under 35 U.S.C. 154(b) by 1951 days.

(21) Appl. No.: 11/731,680

(22) Filed: Mar. 30, 2007

(65) Prior Publication Data

US 2007/0287480 A1    Dec. 13, 2007

(30) Foreign Application Priority Data

May 3, 2006    (KR) .................... 10-2006-0039828

(51) Int. Cl.
*H04W 4/00*    (2009.01)
(52) U.S. Cl.
USPC ............... 455/466; 455/414.1; 455/412.1
(58) Field of Classification Search
USPC .................... 455/466, 412.1–414.4
See application file for complete search history.

(56) References Cited

U.S. PATENT DOCUMENTS

| | | | |
|---|---|---|---|
| 2002/0044634 A1 | 4/2002 | Rooke et al. | |
| 2006/0089164 A1* | 4/2006 | Lee | 455/466 |

FOREIGN PATENT DOCUMENTS

| | | |
|---|---|---|
| KR | 1020050020386 | 3/2005 |
| KR | 1020050118778 | 12/2005 |
| WO | WO 01/33782 | 5/2001 |
| WO | WO 2006/008676 | 1/2006 |

OTHER PUBLICATIONS

3GPP TS 23.140 V6.9.0 "3rd Generation Partnership Project; Technical Specification Group Terminals; Multimedia Messaging Service (MMS); Functional description; Stage 2" (Release 6) (Mar. 2005).*

* cited by examiner

*Primary Examiner* — Lester Kincaid
*Assistant Examiner* — Daniel Lai
(74) *Attorney, Agent, or Firm* — The Farrell Law Firm, P.C.

(57) ABSTRACT

A method of processing a Multimedia Message Service (MMS) message in a mobile communication terminal is disclosed that includes checking in a media file in the MMS message for whether the message can be processed, when an MMS notification message is received; and retransmitting the MMS notification message to another receiver, when the media file in the MMS message cannot be processed. Even when the capabilities of the receiving terminal prevent viewing of the MMS message in the state that it was sent, the recipient is able to view the MMS message through another terminal or an e-mail address as it was compiled by the sender.

12 Claims, 4 Drawing Sheets

APPARATUS AND METHOD FOR TRANSMITTING MULTIMEDIA MESSAGES IN MOBILE COMMUNICATION SYSTEM

PRIORITY

This application claims priority under 35 U.S.C. §119 to an application filed in the Korean Intellectual Property Office on May 3, 2006, assigned Serial No. 2006-39828, the contents of which are incorporated herein by reference.

BACKGROUND OF THE INVENTION

1. Field of the Invention

The present invention relates generally to a mobile communication terminal, and, more particularly, to an apparatus and method for transmitting multimedia messages in a mobile communication terminal.

2. Description of the Related Art

Recently, with new developments in mobile communication technology, Multimedia Message Service (hereinafter, referred to as MMS), used to transmit MMS messages is being offered to mobile communication terminal consumers. MMS, as defined by the $3^{rd}$ Generation Partnership Project (3GPP) technical specifications 22.140 and 23.140, is a service that allows the transmission and receipt of not only text messages, but also voice and audio, still image and video, and a variety of multimedia data between mobile communication terminals.

The MMS defined in the 3GPP adopts a store and forward method. Because the multimedia messages are of substantial size, they cannot be sent and received in the same way that short text messages are transmitted using the short message service (SMS). They must pass through a central, MMS server to be forwarded to the recipient's terminal.

Here, the process in which the MMS message is sent involves the following steps. The MMS message is created in and sent to the MMS server through the sender's terminal. The MMS server that receives the MMS message sends a MMS notification message to the recipient's terminal to notify that the MMS message has been received. The recipient is made aware through the MMS notification message that the MMS message has been received, and can opt to connect to the MMS server and check the MMS message stored in the MMS server. Thus, the user of the receiving terminal is able to accurately receive an MMS message of a comparatively large size. At this time, the MMS message is encapsulated and sent with the media content of the message, i.e. the data required to describe the media content of the message and the address data required to discern the message recipient.

However, the functions of the recipient's terminal may not be completely compatible with the functions of the multimedia content made through the sender's terminal. In other words, the MMS message created and sent by the sender's terminal may have a variety of attached media files, and the recipient's terminal may be incapable of processing all or a portion of the attached media file formats. In this case, an MMS server of the related art must either remove files that are incompatible with the recipient's terminal or alter the file formats to create a compatible format before sending the files. The altering (transcoding) or deleting process is carried out by a capability negotiation with a User Agent (UA) profile of the recipient's terminal.

As a result, it is not always possible for a recipient to receive all the original media files sent by the sender. Therefore, the recipient may receive messages of poor quality. For example, the resolution of an image file may be low, or the file may be received with a portion deleted. In this case, there is no way for the recipient to determine whether the file was sent in this condition.

SUMMARY OF THE INVENTION

An object of the present invention is to substantially solve at least the above problems and/or disadvantages and to provide at least the advantages below. Accordingly, an object of the present invention is to provide an apparatus and a method for transmitting an MMS message in a mobile communication terminal.

Another object of the present invention is to provide an apparatus and a method that enable a sender to transmit an MMS message from a mobile communication terminal to another terminal or an e-mail address.

A further object of the present invention is to provide an apparatus and a method for transmitting an MMS message from a mobile communication terminal to a recipient in the same condition that it was sent by the sender.

According to one aspect of the present invention, a method of processing an MMS message in a mobile communication terminal includes checking whether the MMS message includes media files that cannot be processed, when an MMS notification message is received; and resending the MMS notification message to another receiver, when the MMS message includes media files that cannot be processed.

According to another aspect of the present invention, a method of processing an MMS message in a server includes transmitting an MMS notification message to a receiving terminal, when an MMS message is received; and retransmitting the MMS notification message to another receiver, when a request by the receiving terminal to retransmit the MMS notification message to the other receiver is received.

According to a further aspect of the present invention, an apparatus for processing an MMS message in a mobile communication system includes an MMS server and a receiving terminal, wherein the MMS server transmits an MMS notification message to the receiving terminal when the MMS message is received, and retransmits the MMS notification message to another receiver when the receiving terminal requests a retransmission of the MMS notification message to the other receiver, and the receiving terminal determines whether the MMS message includes media files that cannot be processed when the MMS notification message is received, and requests the MMS server to retransmit the MMS notification message to the other receiver, when it is determined that the MMS message includes media files that cannot be processed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
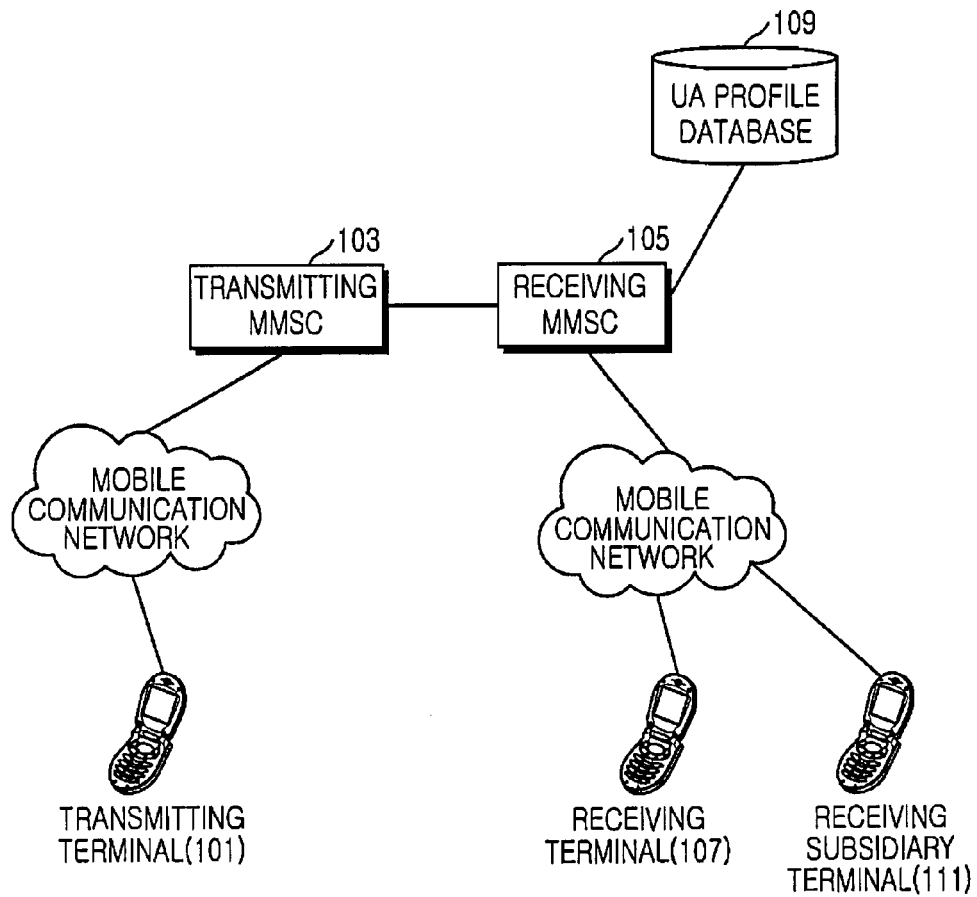
FIG. 1 is a diagram of the configuration of an MMS mobile communication system according to the present invention.

FIG. 1 is a diagram of the configuration of an MMS mobile communication system according to the present invention. The mobile communication system includes a transmitting and a receiving terminal, 101 and 107, respectively, a mobile communication network, transmitting and receiving multimedia message service centers (hereinafter called MMSCs), 103 and 105, respectively, a user agent profile (hereinafter called UA profile) database 109, and a receiving subsidiary terminal 111. Here, the receiving subsidiary terminal 111 is a terminal that is pre-registered as a secondary receiving terminal for the receiving terminal 107.

Referring to FIG. 1, the terminals 101, 107, and 111 are capable of creating, sending, and receiving MMS messages, and have built-in storing and processing capabilities for MMS messages. Here, an MMS client for MMS support is installed in the terminals 101, 107, and 111, and a user can directly create multimedia content for an MMS message using the camera, audio, and other multimedia capabilities built into the user's terminal, or can connect to the Content Provider (CP) that provides a variety of multimedia content in the mobile communication network to create a message. In addition to the functions provided in the related art, when an MMS notification message is delivered from the MMSC 105, the present invention also provides the ability of the receiving terminal 107 to analyze the content of the MMS notification message and compare the analyzed content with its own capabilities and output the comparison results to allow the user to decide whether to resend the MMS notification message to the receiving subsidiary terminal 111. Here, when the user elects to resend the MMS notification message to the receiving subsidiary terminal 111, a request to the MMSC 105 to resend the MMS notification message to the receiving subsidiary terminal 111 is sent.

The mobile communication network sends MMS messages transmitted from a plurality of terminals 101 to the MMSC 103, and sends the MMS messages sent from the MMSC 105 to corresponding receiving terminals 107 and 111. Here, the terminals 101, 107, and 111 may use Hyper-Text Transfer Protocols (HTTP) or Wireless Application Protocols (WAPs) for transmitting and receiving messages with to and from the MMSC 103 and 105. Here, the mobile communication network includes a Base Transceiver Station (BTS) controller and a Mobile Switching Center (MSC). The BTS controller controls a plurality of base transceiver stations, performing wireless channel setting, frequency hopping, and handover processing. The MSC handles the setting of routes for requested calls.

The transmitting and receiving MMSCs 103 and 107 perform the transmitting and receiving of MMS messages. In other words, the MMSC saves an MMS message received from a transmitting terminal 101 through the mobile communication network and also sends an MMS notification message to the receiving terminal 107 to notify that the MMS message has been received. In addition to conventional functions, when a request to resend the MMS notification message from a receiving terminal 107 to a receiving subsidiary terminal 111 is received, the MMSC resends the MMS notification message to the receiving subsidiary terminal 111. Also, when download of the MMS message is requested by the receiving terminal 107 or the receiving subsidiary terminal 111, the MMSC optimally transcodes the media included in the MMS message to be compatible with the receiving terminal 107 or 111, referring to a UA profile database 109, and then transmits them to the receiving terminal 107 or 111. For example, the transcoding is done to make an image size, format (i.e., JPG, GIF, PNG, BMP, WBMP, etc), whether it is color or black & white, audio format (i.e., MP3, MID, WAV, AMR, AAC, etc.) compatible with the receiving terminal 107 or 111 in order to download the message thereto.

The UA profile database 109 stores and controls the profile data of the receiving terminal 107 and the receiving subsidiary terminal 111. For example, it may store and control profile data such as the portable terminal's specifications, such as whether it has MMS capability, its resolution, its color range, its memory capacity, etc.

Figure 2:
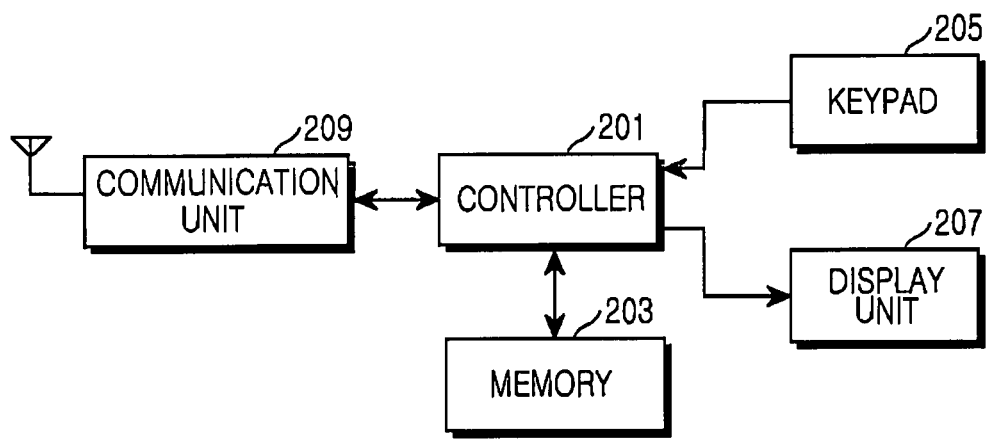
FIG. 2 is a block diagram of the configuration of a mobile communication terminal according to the present invention.

FIG. 2 is a block diagram of the configuration of a mobile communication terminal according to the present invention. The mobile communication terminal includes a controller 201, memory 203, keypad 205, display unit 207, and a communication unit 209.

Referring to FIG. 2, the controller 201, or microprocessor unit, performs the overall operations of a mobile communication terminal. For instance, the controller 201 processes and controls audio communication and data communication. It also analyzes received MMS notification messages, compares the analysis results with the capabilities of the terminal, and determines whether to resend the received MMS notification message to the receiving subsidiary terminal, based on the compared results. Thus, the controller also performs the receiving of the MMS message by its own terminal or another receiving terminal. A description of the processing and controlling of the above-described controller 201 will now be given.

The memory 203 can include ROM, RAM, flash ROM and other memory types. The ROM (Read Only Memory) 203 stores microcodes of programs for the controller's 201 processing and controlling and stores various reference data. The ROM 203 especially stores a program for an MMS message being received by its own terminal or by another receiving terminal. The program uses the results of an analysis of the received MMS notification message to compare the analyzed message to the capabilities of its own terminal. Whether to retransmit the MMS notification message to another receiving terminal is determined based on the comparison results. RAM (Random Access Memory) 105 is a working memory of the controller 201, for storing temporary data arising from the use of various programs. A flash ROM is used to store renewable pieces of storage data.

The keypad 205 consists of a plurality of function keys/buttons including number keys for the numerals 0-9, a menu button, a cancel (erase) button, an OK button, a talk (dial) button, an end button, an internet connecting button, and navigational (or directional) keys. When a user presses a key, its corresponding input signal is sent to the controller 201. The display unit 207 displays operating information during the operation of the mobile communication terminal, numerals and characters that have been entered, various moving images and still images, etc. Here, the display unit 207 may use a color Liquid Crystal Display (LCD).

Also, the communication unit 209 processes a wireless signal transmitted and received through an antenna. For example, during a transmitting operation, the communication unit 209 will channel-code and spreads data, and then transmit the data after Radio Frequency (RF) processing. During a reception operation, the communication unit 209 despreads and channel-decodes a received signal to restore data.

Figure 3:
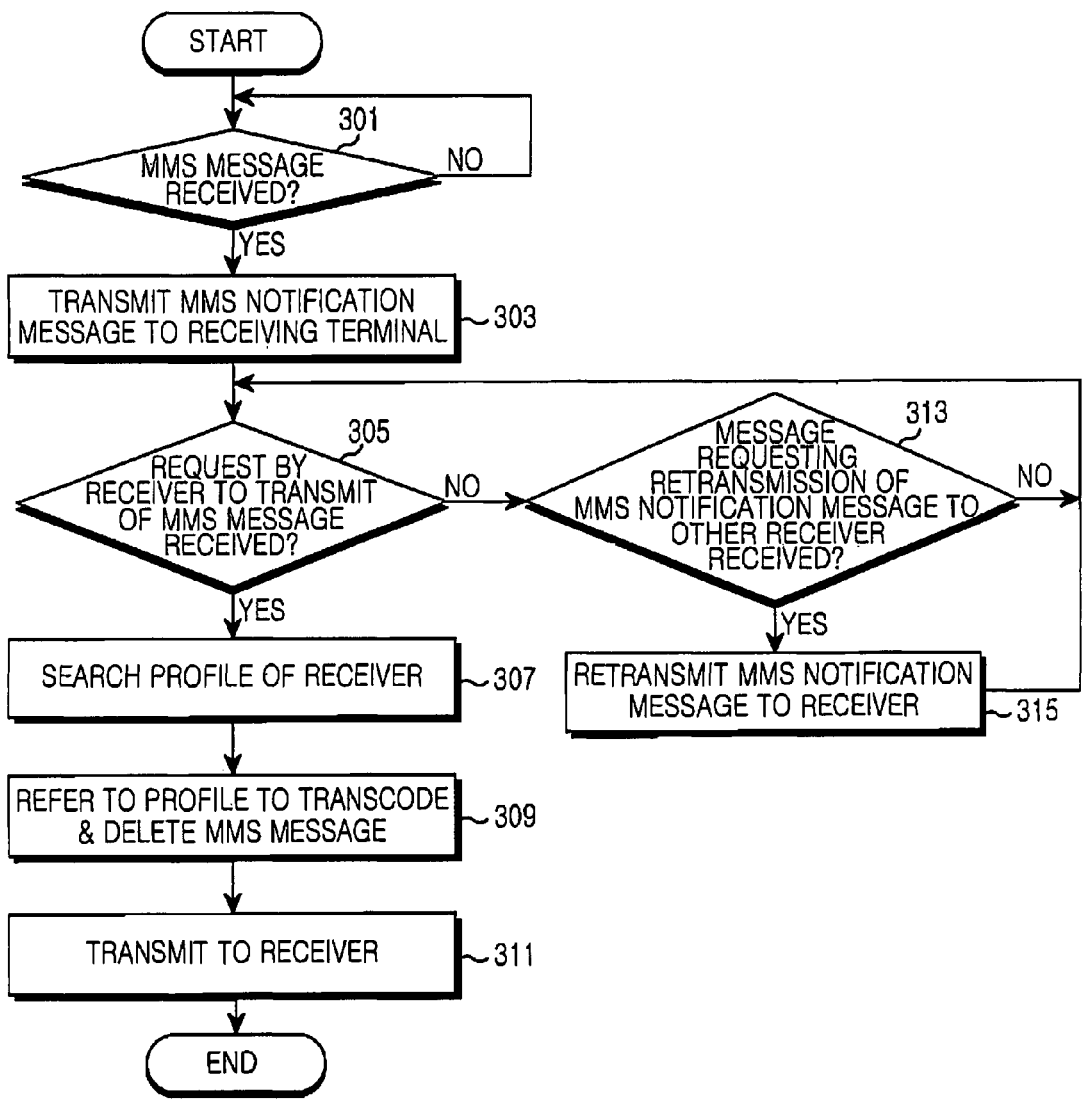
FIG. 3 is a flowchart showing a method of processing an MMS message in a Multimedia Message Service Center (MMSC) at a recipient's end, according to the present invention.

FIG. 3 is a flowchart showing a method of processing an MMS message in a Multimedia Message Service Center (MMSC) at a recipient's end, according to the present invention. Referring to FIG. 3, the receiving MMSC 105 determines whether an MMS message is being received in step 301. That is, it is detected whether a message is being sent by the sending terminal 101 through the transmitting MMSC 103. The MMS message includes sender and receiver data. Here, an example of an MMS message being received through a mobile communication terminal will be described; however the MMS message may be created by a user using a creating tool on a personal computer and sent to the receiving MMSC 105, for example.

When the MMS message is received, the receiving MMSC 105 notifies the relevant receiving terminal 107 of the message. That is, an MMS notification message to notify that the MMS message is received (i.e. it has the MMS message to be transmitted) is transmitted. Here, the MMS notification message header data includes X-Mms-Element-Descriptor field-data, and the receiving terminal 107 uses the X-Mms-Element-Descriptor field data to acquire data on the contents, type, and format of the message. Based on the acquired data, it is possible to determine whether the media files included in the MMS message may be processed. Also, the header data of the MMS notification message may include the title of the message, data on the sender and time sent, call back data, URLs, size of contents, whether there are attached files, message type, method of transmission, etc.

Then, in step 305, the receiving MMSC 105 detects whether a request by a receiver to send the MMS message is being received. Here, a message requesting a transmission of the MMS message includes UA profile Uniform Resource Locator (URL) data. The receiver may be the receiving terminal 107 or another receiver for the receiving terminal 107—for example, the receiving subsidiary receiver 111 or an e-mail server.

When a request by a receiver to send the MMS message is not received in step 305, the receiving MMSC 105 determines in step 313 if there is a request by the receiving terminal 107 to resend the MMS notification message to another receiving terminal. When a request by the receiving terminal 107 to resend the MMS notification message to another receiving terminal is received, the receiving MMSC 105 first transmits the MMS notification message to a relevant receiver in step 315, and returns to step 305. On the other hand, if a request by the receiving terminal 107 to resend the MMS notification message to another receiving terminal is not received, the receiving MMSC 105 returns to step 305 to again determine whether a request by the receiving terminal to send the MMS message is received.

When a request by a receiver to send the MMS message is received in step 305, the receiving MMSC 105 searches for the profile of the receiver in step 307. That is, the UA profile URL data included in the requested transmitted message that is received is used to search the relevant receiver location profile in the UA profile database 109.

Then, the receiving MMSC 105 proceeds to step 309, and it refers to the profile of the searched relevant receiver, transcodes the specifications of text image files, etc. to be optimally compatible with a receiver. Where there is a media file incompatible with the receiver, the media file is deleted. Then, in step 311, the receiving MMSC 105 transmits the MMS message that was transcoded or deleted to the corresponding receiver, and terminates the algorithm according to the present invention.

Figure 4:
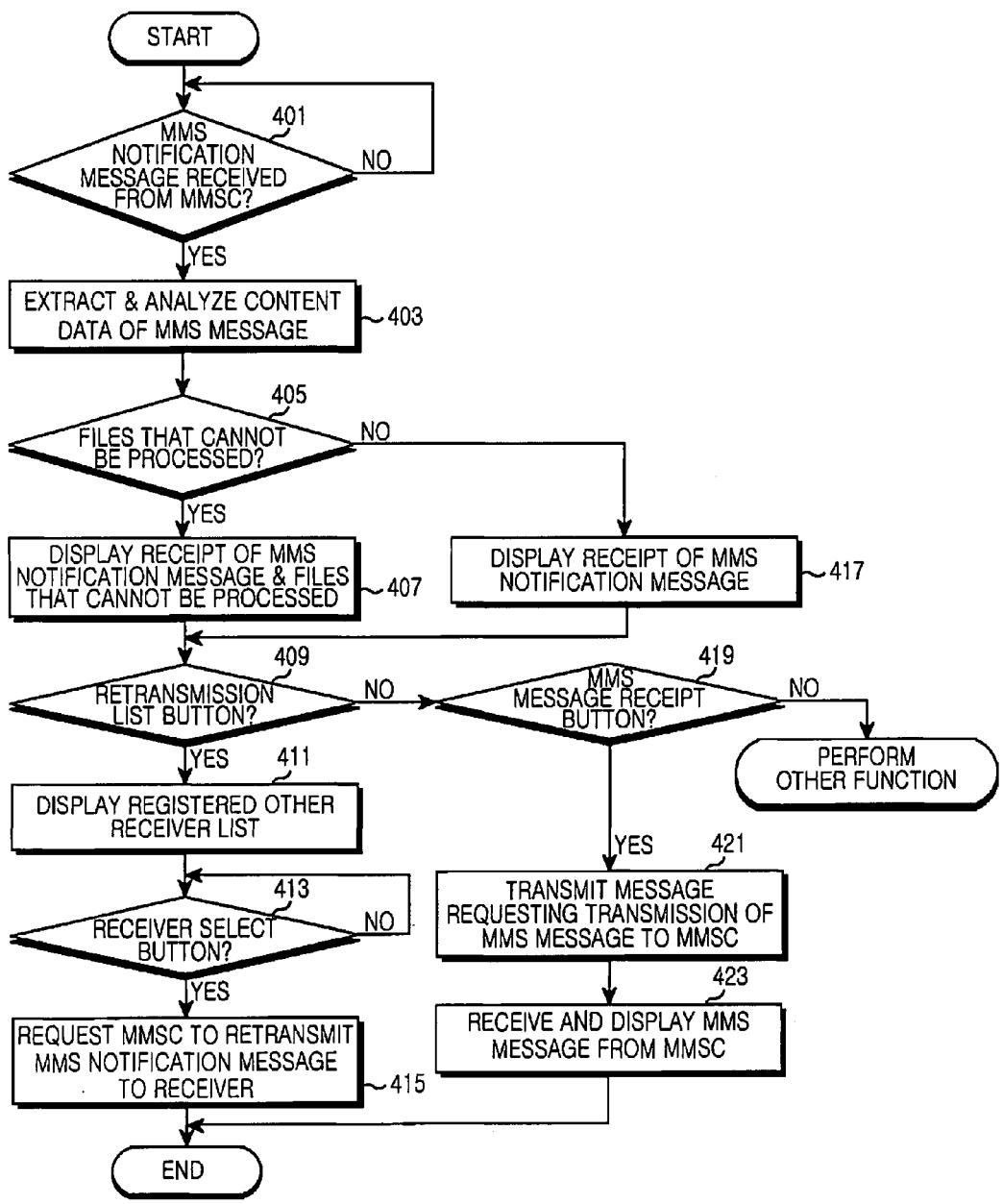
FIG. 4 is a flowchart showing an MMS message receiving method at a recipient's terminal, according to the present invention.

FIG. 4 is a flowchart showing an MMS message receiving method at a recipient's terminal, according to the present invention. Referring to FIG. 4, the receiving terminal 107 detects whether an MMS notification message is received from the MMSC 105 in step 401. When the MMS notification message is received, the receiving terminal 107 extracts the content data of the MMS message from the received MMS notification message in step 403, and uses the extracted content data to analyze whether the media files included in the MMS message to be received can be processed. Here, the MMS notification message header data includes X-Mms-Element-Descriptor field data, and the receiving terminal 107 uses the X-Mms-Element-Descriptor field data to obtain data on the content, type, and format of the MMS message. Through the obtained content data, it can be determined whether it is possible to process the media files included in the MMS message.

Then, in step 405, the receiving terminal 107 detects whether the MMS message to be received includes media files that cannot be processed. If media files that cannot be processed are included in the MMS message to be received, the receiving terminal 107 proceeds to step 407. The receiving terminal 407 displays a notification message on the display unit 207 that an MMS notification message has been received from the MMSC 105 and that there are media files that cannot be processed in the MMS message to be received. On the other hand, when there are no media files that cannot be processed in the MMS message to be received, the receiving terminal proceeds to step 417. The receiving terminal 107 displays a notification message on the display unit 207 that an MMS notification message has been received from the MMSC 105.

Thereafter, the receiving terminal 107 detects whether there is a button input for displaying a retransmission list in step 409. Here, the retransmission list means a list of other receivers that were already registered through a user's button input and stored in the memory 203. The addresses or e-mail addresses of other terminals may be registered in the retransmission list. When a button input for displaying the retransmission list is detected, the receiving terminal 107 extracts the list of other receivers from the memory 203 and displays the list on the display unit 207 in step 411.

Then, the receiving terminal 107 detects if one receiver from the list of other receivers is selected in step 413. If one receiver has been selected, in step 415, the receiving terminal 107 requests the MMSC 105 to resend the MMS notification message to the selected receiver, and then terminates the algorithm according to the present invention. Here, the address of the other receiver may be directly inputted by a user through a window for inputting address on the display unit 207.

When a button input for displaying a retransmission list is not detected in step 409, the receiving terminal proceeds to step 419. The receiving terminal 107 determines if there is a button input for receiving the MMS message in step 419. When a button input for receiving the MMS message is not detected, the receiving terminal 107 performs a corresponding function. On the other hand, when a button input for receiving the MMS message is detected, the receiving terminal 107 transmits a message requesting a transmission of the MMS message to the MMSC 105. In other words, the MMSC 105 is contacted and a request for download of the MMS message is made in Step 421. Here, the message requesting transmission of the MMS message includes profile URL data of its receiving terminal 107, and the message is transmitted in a 'GET' method of an HTTP protocol to the MMSC 105.

Next, the receiving terminal 107 receives the MMS message from the MMSC 105 in step 423, and displays the MMS message on the display unit 207, upon which it terminates the algorithm according to the present invention. Here, the respective contents included in the MMS message are stored in the memory 203.

The receiving subsidiary terminal 111 that is a predetermined other receiver for the received terminal 107, like the receiving terminal 107, has a resending capability of the MMS notification messages. Therefore, the reception of the MMS message by the receiving subsidiary terminal 111 follows the same process as the MMS message receiving method of the receiving terminal 107, shown in FIG. 4.

As described above, according to the present invention, the MMS notification message in a mobile communication terminal is analyzed, the analysis results are compared to the capability of the terminal. Then, the comparison results are used to determine whether to transmit the MMS notification message to another receiver, so that even in a situation where the capabilities of the receiving terminal prevent viewing of the MMS message in the state that it was sent, the recipient is able to view the MMS message through another terminal or an e-mail address as it was compiled by the sender.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of processing a Multimedia Message Service (MMS) message in a mobile communication system, comprising the steps of:
    transmitting, by a receiving MMS server, a MMS notification message to a receiving terminal, the MMS notification message for notifying a receipt of an MMS message,
    determining, by the receiving terminal, whether the corresponding MMS message includes media files that can be processed using the MMS notification message, requesting the MMS server to retransmit the MMS notification message to another receiver when the MMS message includes media files that cannot be processed, and requesting a transmission of the MMS message when the MMS message can be processed, and
    retransmitting, by the receiving MMS server, the MMS notification message to the other receiver when the request of the receiving terminal to retransmit the MMS notification message to the other receiver is received, or transforming and transmitting the media files included in the MMS message when the request to transmit the MMS message is received.

2. The method of claim 1, wherein determining whether the corresponding MMS message includes media files that can be processed is performed using content data of the MMS message included in the MMS notification message.

3. The method of claim 1, wherein requesting the receiving MMS server to retransmit the MMS notification message to another receiver comprises:
    displaying, by the receiving terminal, that the MMS message includes media files that cannot be processed on a display unit, when the MMS message includes media files that cannot be processed;
    checking, by the receiving terminal, whether the other receiver is inputted, when a button input for a retransmission of the MMS notification message is provided; and
    transmitting, by the receiving terminal, a message to an MMS server, the message for requesting a retransmission of the MMS notification message to the another receiver, when the other receiver is inputted.

4. The method of claim 3, wherein checking whether the other receiver is inputted comprises:
    displaying, by the receiving terminal, a registered other receiver list on the display unit; and
    checking, by the receiving terminal, whether one receiver from the other receiver list is selected.

5. The method of claim 4, wherein the other receiver list includes at least one of another terminal and an e-mail server.

6. The method of claim 1, further comprising displaying, by the receiving terminal, the MMS notification message on a display unit, when the MMS notification message is received.

7. An apparatus for processing a Multimedia Message Service (MMS) message in a mobile communication system, the apparatus comprising a receiving MMS server and a receiving terminal,
    the receiving MMS server being adapted to transmit an MMS notification message to a receiving terminal, the MMS notification message for notifying a receipt of an MMS message, retransmit the MMS notification message to another receiver when the request of the receiving terminal to retransmit the MMS notification message to the other receiver is received, or to transform and transmit the media files included in the MMS message when the request to transmit the MMS message is received,
    the receiving terminal being adapted to determine whether the corresponding MMS message includes media files that can be processed using the MMS notification message, request the MMS server to retransmit the MMS notification message to the other receiver when the MMS message includes media files that cannot be processed, and a request a transmission of the MMS message when the MMS message can be processed.

8. The apparatus of claim 7, wherein the receiving terminal is further adapted to determine whether the corresponding MMS message includes media files that can be processed using content data of the MMS message included in the MMS notification message.

9. The apparatus of claim 7, wherein the receiving terminal is further adapted to
    display that the MMS message includes media files that cannot be processed on a display unit, when the MMS message includes media files that cannot be processed;
    check whether the other receiver is inputted, when a button input for a retransmission of the MMS notification message is provided; and
    transmit a message to the receiving MMS server, the message for requesting a retransmission of the MMS notification message to the another receiver, when the other receiver is inputted.

10. The apparatus of claim 9, wherein the receiving terminal is adapted to
    display a registered other receiver list on the display unit; and
    check whether one receiver from the other receiver list is selected.

11. The apparatus of claim 10, wherein the other receiver list includes at least one of another terminal and an e-mail server.

12. The apparatus of claim 7, wherein the receiving terminal is adapted to display the MMS notification message on a display unit, when the MMS notification message is received.

* * * * *